United States Patent [19]
Petersen

[11] Patent Number: 4,621,916
[45] Date of Patent: * Nov. 11, 1986

[54] MAGNETIC POSITIONING AND CONTOURING OF A BLADE MECHANISM

[75] Inventor: Christian C. Petersen, Westwood, Mass.

[73] Assignee: Polaroid Corporation, Cambridge, Mass.

[*] Notice: The portion of the term of this patent subsequent to Nov. 15, 2000 has been disclaimed.

[21] Appl. No.: 566,310

[22] Filed: Dec. 28, 1983

[51] Int. Cl.$^4$ .............................................. G03B 9/42
[52] U.S. Cl. ............................ 354/234.1; 354/226; 354/247; 354/248
[58] Field of Search ............... 354/226, 234.1, 235.1, 354/241, 242, 245–249

[56] References Cited

U.S. PATENT DOCUMENTS

| | | | |
|---|---|---|---|
| 3,087,400 | 4/1963 | Brandt | 95/40 |
| 3,116,670 | 1/1964 | Ball | 95/10 |
| 3,185,060 | 5/1965 | Borghesani | 95/45 |
| 3,336,852 | 8/1967 | Levin | 95/53 |
| 3,685,423 | 8/1972 | Dahlgren | 95/57 |
| 3,797,919 | 3/1974 | McClenahan | 350/270 |
| 3,876,288 | 4/1975 | Iwata et al. | 350/160 |
| 3,877,045 | 4/1975 | Bloom et al. | 354/275 |
| 3,882,522 | 6/1975 | Erlickman | 354/30 |
| 3,900,855 | 8/1975 | Stempeck | 354/29 |
| 3,902,792 | 9/1975 | Plummer | 350/189 |
| 3,903,528 | 9/1975 | Kee | 354/29 |
| 3,910,687 | 10/1975 | Iwata | 350/267 |
| 3,945,025 | 3/1976 | Stempeck | 354/29 |
| 4,024,552 | 5/1977 | Kondo | 354/234 |
| 4,051,499 | 9/1977 | Kondo | 354/234 |
| 4,060,313 | 11/1977 | Kondo | 350/269 |
| 4,130,357 | 12/1978 | Erlichman et al. | 354/241 |
| 4,162,831 | 7/1979 | Gold | 354/31 |
| 4,326,787 | 4/1982 | Senuma | 354/246 |
| 4,415,251 | 11/1983 | Petersen | 354/230 |
| 4,433,273 | 2/1984 | Larson et al. | 200/159 |

FOREIGN PATENT DOCUMENTS 2099181  5/1981  United Kingdom ................. 27/58

Primary Examiner—Michael L. Gellner
Attorney, Agent, or Firm—Leslie J. Payne

[57] ABSTRACT

There is disclosed an arrangement for magnetically maintaining a magnetically permeable and flexible blade mechanism of a photographic apparatus in a preselected orientation with respect to itself and a lens element despite movement of the blade mechanism along two generally transversely situated axes.

12 Claims, 5 Drawing Figures

MAGNETIC POSITIONING AND CONTOURING OF A BLADE MECHANISM

BACKGROUND OF THE INVENTION

In general this invention relates to the positioning of a blade mechanism and, more particularly, to the magnetic positioning of a blade mechanism.

Focusing systems are known in which an optical lens element changes its distance to a focal plane in accordance with the object distance. Commonly-assigned U.S. Pat. No. 3,902,792 describes one such system.

Problems are associated with these focusing systems when used with simple lenses of the fixed-focus type. These problems are normally overcome by maintaining a fixed spatial relationship between the aperture stop and the meniscus lens element of the focusing system. Maintaining such a fixed relationship is relatively easy to obtain when the meniscus lens element and the aperture stop can be moved as a unit.

However, when a shutter is introduced into such an arrangement, the situation becomes somewhat complicated. This is because the aperture associated with the shutter may interfere with the stop's function in correcting coma aberration or actually take over its function if proper precautions are not exercised. There are a number of proposals for solving such complications.

One provides a stationary shutter whose aperture is sufficiently large so that it never becomes part of the optical system or interferes with a coma correcting stop. In this manner, the lens may be focused without degradation in image quality, but the shutter must, in general, be relatively large and probably relatively expensive, as, for example, a focal plane type.

Another solution involves moving the entire shutter assembly with the lens to maintain some fixed shutter-to-lens distance as the lens is focused. This is a well-known approach used in folding type cameras. Commonly-assigned U.S. Pat. Nos. 3,185,060 and 3,087,400 are illustrative of this type of proposal. Commonly-assigned U.S. Pat. No. 3,902,792 discloses structure for maintaining such a spatial relationship in a rigid body type camera. These foregoing approaches have been considered less than entirely satisfactory because they add to camera size and require that the entire shutter be moved in concert with the lens. U.S. Pat. No. 4,130,357 shows a flexible shutter which moves with the lens and must possess predetermined flexing characteristics, as well as a relatively complicated blade guide and blade coupling arrangement.

SUMMARY OF THE INVENTION

In accordance with the present invention, there is provided a photographic apparatus comprising means for defining an image plane; and, optical means for directing and focusing image forming rays at the image plane. This optical means includes at least one lens element displaceable along its optical axis to different focal positions so that at each focal position the image carrying light rays from a subject at correspondingly different distance ranges from the apparatus are focused at the focal plane. Mounting means for the optical means is provided for mounting its lens element for movement to the different focal positions during focusing. Means are provided for unblocking and blocking the optical path to produce an exposure interval. The unblocking means includes at least a flexible blade member which is translationally movable in a given path generally transverse to the optical axis and is movable generally along the optical axis. Included is means on at least one of the blade member or the optical means for magnetically coupling one to the other in such a manner that the blade can translate along the given path as well as move conjointly with the lens element without changing the distance between the lens element and the blade.

In an illustrated embodiment, the magnetic coupling means includes a permanent magnet arrangement carried by the optical means and conjointly movable with the lens assembly. The blade member is low in mass, flexible and is magnetically permeable so that the blade is coupled directly to the magnet of the optical means.

Among the objects of the invention are therefore, the provision of a photographic apparatus having an improved arrangement for magnetically coupling a blade element to a lens assembly movable along the optical axis and, the provision of an improved arrangement of the foregoing type which retains a predetermined distance between a lens element and the blade.

Other objects and further scope of applicability of the present invention will become apparent from the detailed description to follow when taken in conjunction with the accompanying drawings wherein like parts are indicated by like reference numerals throughout the several views.

DETAILED DESCRIPTION

Figure 1:
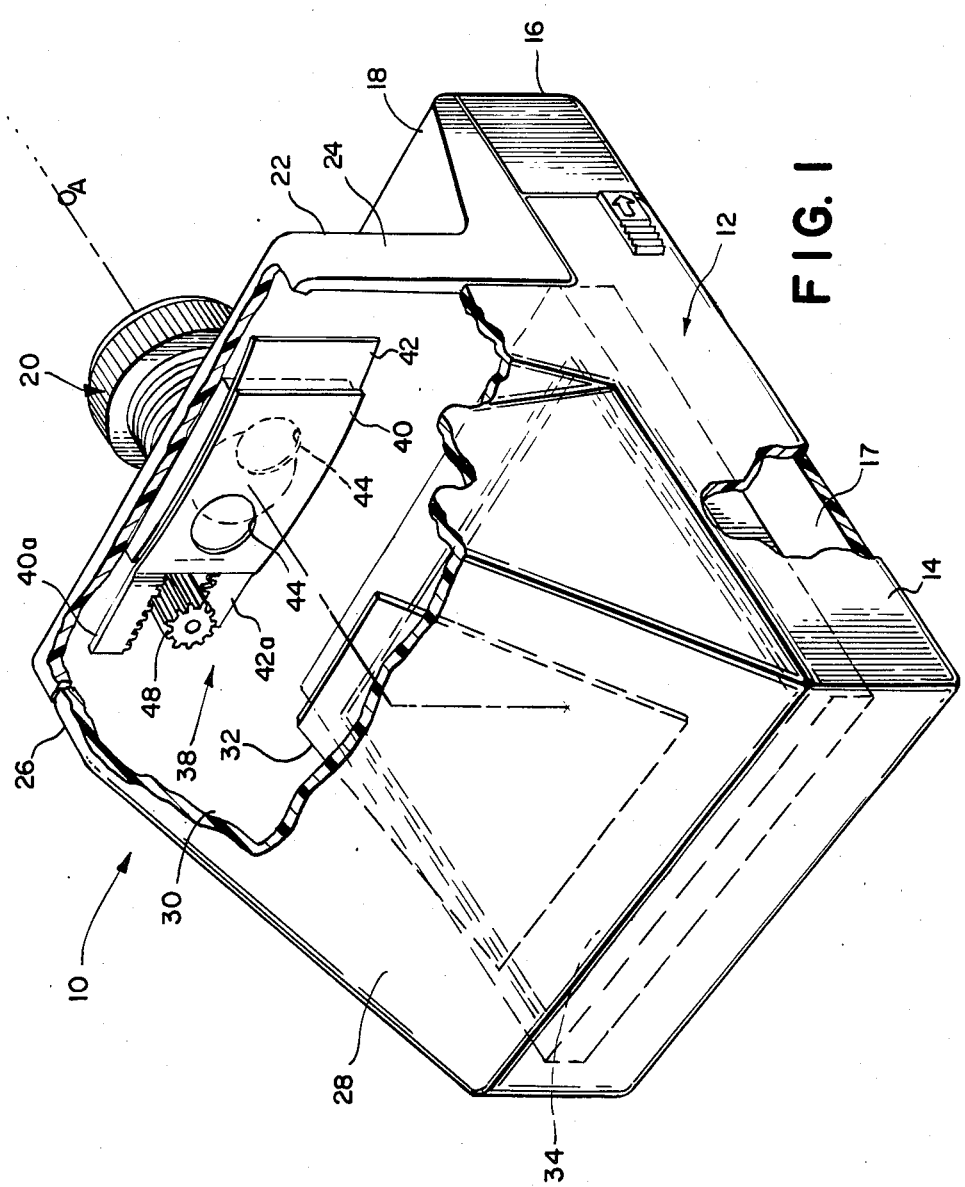
FIG. 1 is a perspective view of a photographic apparatus partly broken away, showing details of the present invention.
Figure 2:
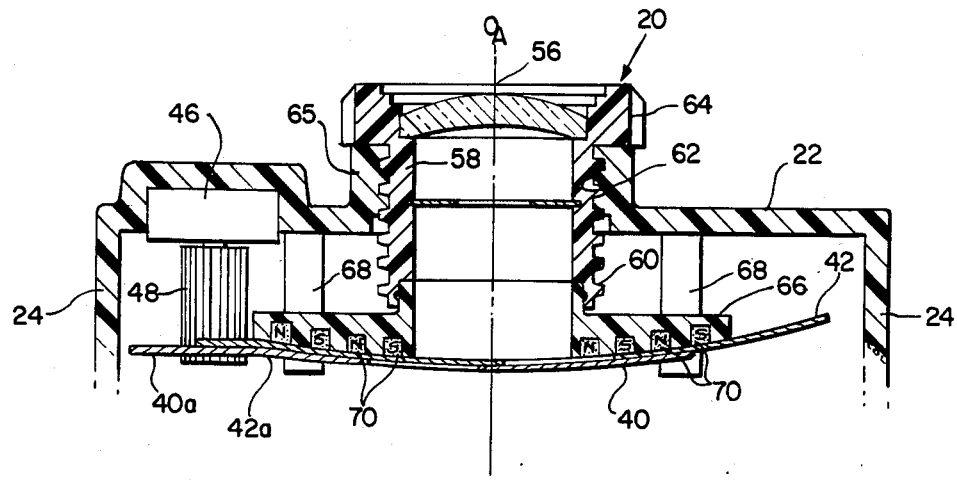
FIG. 2 is an enlarged cross-sectional view showing further detail of the present invention in one condition of operation.
Figure 3:
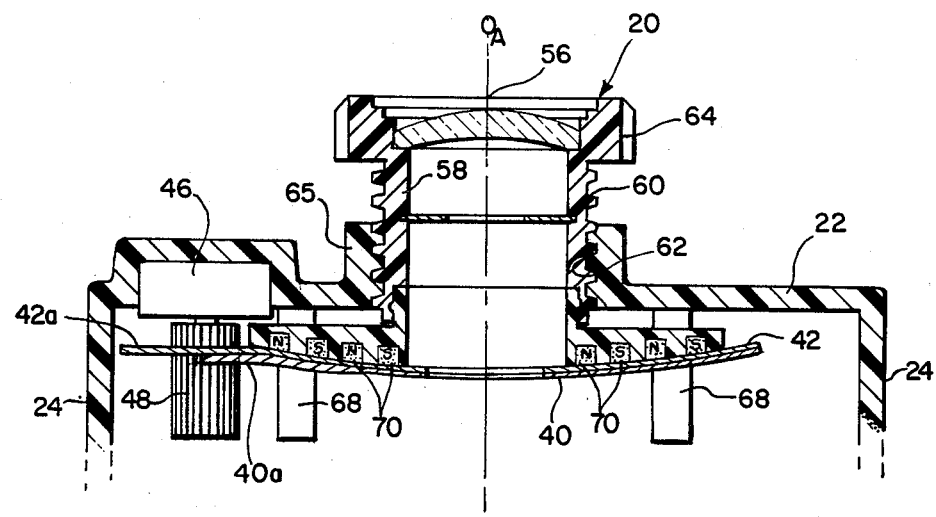
FIG. 3 is a view similar to FIG. 2, but showing components in a different operational condition.

Reference is now made to FIGS. 1 to 3 for showing an embodiment of the present invention. As illustrated, there is disclosed a camera 10 having a rigid boxlike housing 12. The camera 10 has a construction like that shown in commonly assigned U.S. Pat. No. 4,130,357. Since the camera construction does not, per se, form part of the present invention, a detailed description thereof will not be given. However, only that structure necessary for an understanding of the present invention will be set forth. The camera 10 is of the instant or self-developing type, although other cameras can be used. Included in the housing 12 is a lower base portion 14 and pivotally attached thereto is a film loading door 16. When the loading door 16 is opened (not shown), a film pack 17 containing individual film units (not shown) of the self-developing type may be loaded into a film receiving chamber formed in the base section 14. A representative example of such a film pack is described in commonly-assigned U.S. Pat. No. 3,877,045. The loading door 16 is formed with a film unit withdrawal slot (not shown) for permitting exiting of an exposed film unit. Although not shown, there is provided a conventional motorized spread assembly which spreads the processing fluid contained in the film unit following exposure and also serves to advance the film unit to the exterior of the camera. Included in the upper portion of the housing 12 is an apron section 18 which extends rearwardly to a forwardly facing and generally upstanding adjustable taking lens system 20 on a forward lens mounting wall 22. Joining the lens wall 22 is a pair of side walls 24 and a top wall 26. The top wall 26 joins with an inclined rear wall 28 to form an interior exposure chamber 30. The rear wall 28 has a trapezoidal shaped mirror 32 which is at an angle to an optical axis OA. The mirror 32 directs downwardly the image forming rays traveling along the optical axis, OA, to a focal plane 34 defined coextensively with the top film unit of the film pack. The objective taking lens assembly 20, in combination with the mirror 32, provide an optical means for establishing an optical path between the lens assembly and the camera focal plane 34 so that a real image may be formed at the focal plane.

Reference is now made to a flexible shutter blade assembly indicated generally by reference numeral 38. As shown, the shutter blade assembly 38 is of the scanning type which includes generally elongated and flexible blade elements 40 and 42. Each of the blade elements 40, 42 includes an aperture 44, which is arranged to progressively coincide with the other aperture, relative to the optical axis OA, for defining progressively varying exposure values as a function of shutter blade displacement. The exposure aperture and the objective taking lens 20 cooperate to provide the camera 10 with a field of view which defines the area of the photographic scene that will be imaged on the focal plane.

Each of the blades 40, 42 includes a relatively rigid driving section 40a, 42a for purposes of facilitating cooperation with a driving arrangement as will be discussed. These driving sections 40a, 42a are relatively straight for reasons which will later make themselves apparent. In this embodiment, the remainder of the scanning shutter blades are thinner than their respective driving sections 40a, 42a. The blades can be made of an extremely thin and flexible polyester base material covered with a ferric oxide coating. For illustration, the non-driving sections can have a 1 mil thickness, whereas the driving sections can have a thickness of several mils. The ferric oxide coating will produce a magnetically permeable blade for purposes which will be pointed out. The blades 40, 42 are sufficiently pliable to follow a preselected contour. Although a ferric oxide coated polyester base material has been disclosed, the present embodiment contemplates the use of a Mylar base material for the blades as well or any magnetically coated or magnetically permeable flexible, optically dense material. It should be pointed out that the shutter blade extensions 40a, 42a remain in contact with the pinion 48. As a consequence, the shutter blades 40, 42 transversely reciprocate even though they can be slightly bowed.

For driving the shutter blades 40, 42 between blocking and unblocking conditions, there is provided a stepper motor which is generally indicated by reference numeral 46. Such a stepper motor 46 can be of the kind described in the last noted patent and it is fixedly attached to the inner surface of the front lens wall 22. Energization and control of the stepper motor 46 may be effected by well-known electronic control means (not shown) such as of the types described in commonly-assigned U.S. Pat. Nos. 3,900,855; 3,903,528; 3,945,025; and 3,882,522. Since details of such a control system do not constitute a part of the present invention, only a brief description thereof will be set forth. It will be recognized that the torque capacity of the stepper motor 46 should be sufficient to overcome increased frictional forces which may arise by virtue of the shutter blades 40, 42 moving in a manner to be described. A pinion 48 attached to the motor 46 drives rack extension driving sections 40a, 42a formed on the blades 40, 42; respectively. These rack extensions 40a, 42a are constructed and arranged so that they continuously meshingly engage with the pinion 48 even while the blades 40, 42 slide along the pinion as will be described and are relatively rigid so a to transmit the driving forces.

Reference is again made to the taking lens assembly 20. Included in the taking lens assembly 20 is an aspheric meniscus positive taking lens element 56 which is mounted in a generally cylindrical thin walled opaque lens mount 58. There is provided a screw threaded exterior surface 60 which is threadedly received in a threaded opening 62 formed in the front lens wall 22. Owing to this arrangement, the positive optical taking lens element 56 can be displaced along the optical axis, OA, by rotating the lens mount 58. Accordingly, the back focal length of the taking lens 56 may be changed in order to effect focusing of the camera 10 for a given range of different object distances. Thus, this mounting arrangement provides a means for allowing the optical lens element 56 to be moved along the optical axis, OA, to change the distance separating the focal plane 34 of the camera for purposes of facilitating focusing of the camera. The amount of travel of the lens mount 58, as it is focused for short distances and objects located at infinity is determined by two stop positions. The first stop occurs when a rear surface of a bezel 64 on the lens mount abuts a shoulder 65 formed on the front lens wall 22. The second stop position can occur when an enlarged interior blade contouring member 66 coupled to the lens mount 58 abuts an interior surface surrounding the threaded opening 62. In this embodiment, the lens mount 58 is coupled to the blade supporting and contouring member 66 so that the latter axially moves with the lens mount 58, but is not rotated therewith. Along these lines the camera body is provided with a pair of rotation restraining arms 68 which prevent rotation of the supporting and contouring member 66 while the lens mount 58 is selectively rotated. This is needed because of the desire to maintain the blades in a predetermined contour during their translation.

In this embodiment, the axial spacing between the overlapping and coinciding apertures 44 and the taking lens element 56 is fixed despite the fact that the lens mount 58 axially translates.

According to this invention, there is provided means for magnetically coupling both the shutter blades 40, 42 to the blade supporting member 66 of the lens mount 58 for insuring that the noted lens/shutter blade axial separation is constantly maintained during axial focusing displacement of the taking lens assembly 20. In this embodiment, the supporting member 66 is provided with a pairs juxtaposed permanent magnet 70 arranged in side-by-side fashion and which extend along the width of the blade supporting member. The exterior surfaces of the magnets 70 alternate in polarity, such as shown. The flux can therefore travel between adjacent magnets 70 and enhance the holding power of the magnetic arrangement on the blades. These permanent magnets 70 are, preferably, of the rare earth type. These magnetic pole surfaces are in intimate contact with the innermost blade element 42 by virtue of magnetic attractive forces created therebetween.

It will be appreciated, therefore, that those portions of the blades on the supporting member 66 will remain so. Thus, the blades need not have special resilient characteristics and there is no need to limit the translation to avoid affecting its resilient characteristics. Moreover, the noted magnetic attractive forces are such as to have relatively weak magnetic shear strength. That is, they allow relatively easy sliding movement of the shutter blades transversely to the optical axis, OA. Although the present embodiment discloses the magnets, 70 being present on the lens mount 58, it will, of course, be appreciated that the magnets could be carried by the blade members or blade guide and that the supporting member 66 of the lens mount 58 could be made of magnetically permeable material. Alternatively, magnets on the supporting member could cooperate with magnets carried by the shutter blades. Hence, a very effective yet simple coupling arrangement is provided for.

Rotation of the pinion will effect countertranslation of the shutter blades 40, 42. The blade extension 40a, 42a are relatively rigid with respect to the blade remainder and move along general linear paths. However, the blades 40, 42 are extremely flexible and they permit the lens mount 58 to move between the axial limits shown in FIGS. 2 and 3 without affecting either the linear motion of the extension 40a, 42a or the fact that other portions of the blades 40, 42 remain in a preselected contoured condition on the supporting member during translation of such blades as well as in intimate light-sealing contact with each other. Advantageouly of course, this represents an extremely simple construction allowing the blades to be displaced not only transversely to the optical axis OA between blocking and unblocking optical axis OA between blocking and unblocking conditions, but also so that the lens mount 58 can move along the optical axis.

Figure 4:
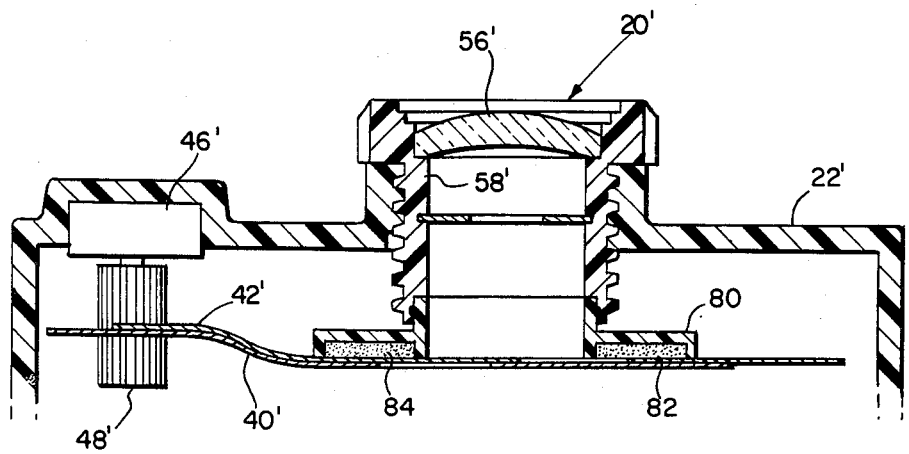
FIG. 4 is an enlarged fragmented view, partly in section, showing another embodiment of the present invention; and, FIG. 5 is a view similar to the FIG. 4, but showing another condition of operation.
Figure 5:
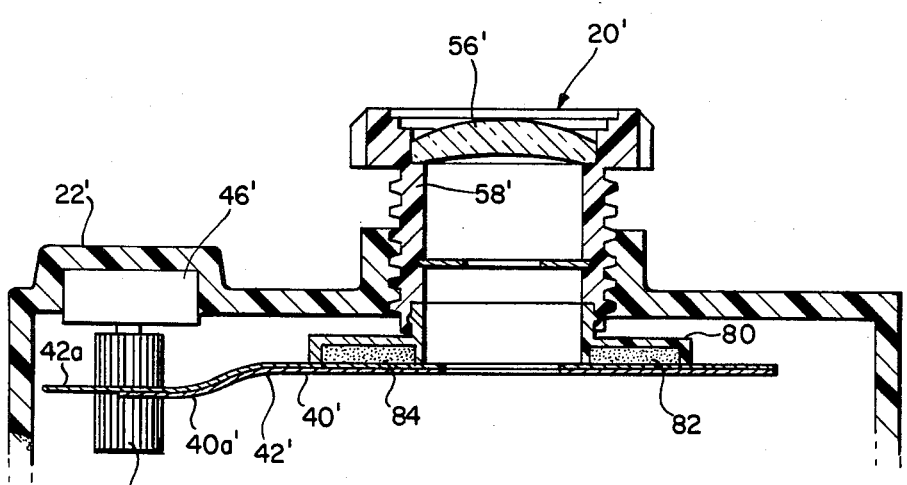

FIGS. 4 and 5 show another preferred embodiment made according to the present invention. Instead of having the blades move along a contoured surface, it is intended to have the blades 40', 42' traverse along a path generally perpendicular to the optical axis OA. So instead of having a blade supporting member as in the last embodiment, the blades 40', 42' are mounted for translation on the enlarged flange 80 of the lens mount 58. They are mounted so as to be flush with the chambered, exterior blade engaging surface 82 on annular permanent magnet 84. Although the permanent magnet 84 is a single unit, there can instead be a plurality of circumferentially spaced magnets. The blade engaging surface 82 is sufficiently wide so as to provide a mounting surface that will enable the blades 40', 42' to remain generally straight with respect to the optical axis OA during exposure translation of the blades and focusing movement of the lens mount. It will be noted that in this embodiment, there is no necessity for restraining arms 68 because the lens mount 58' can rotate while still keeping the blades 40', 42' in intimate contact therewith. This is because the magnetic shear strength is weak enough to permit the blades to move relatively easily along the magnetic surface. It should be noted that the blades of the previous embodiment can also translate because the magnetic shear strength is low enough to permit their translation. Since the blades 40', 42' are extremely thin and flexible, they can bend as the lens mount 58' is dispaced axially without disrupting the straightness of the blades across the optical axis OA. In this embodiment as with the last, the blade extensions 40a', 42a' are relatively rigid and are in meshing engagement with the pinion. Also, these extensions are prevented from sliding on the pinion 48'.

It will be apparent to those skilled in the art that modifications and/or changes may be made in the illustrated embodiments without departure from inventive concepts manifested thereby. Accordingly, it is expressly intended that the foregoing disruptions are of preferred embodiments only, not limiting, and that the true spirit and scope of the present invention be determined by reference to the appended claims.

What is claimed is:

1. A blade mechanism for use in controlling scene radiation along a given optical axis, said mechanism comprising:

means for unblocking and blocking the optical axis for controlling scene radiation therealong, said unblocking means includes at least a thin, flexible blade member which is generally translatable along a path intersecting the optical axis; means for driving said blade member, said driving means including a driving surface which cooperates with said blade member so as to allow translation of the latter along the intersecting path and along said optical axis, supporting means including a blade supporting surface for supporting said blade member during translation along said path; and means for magnetically coupling said blade member to said supporting means so as to retain said blade member in intimate supporting engagement with said supporting surface when said blade translates relative to said supporting means along said path.

2. A blade mechanism for use in controlling radiation along a given optical axis, said mechanism comprising;

means for unblocking and blocking the optical axis for controlling radiation therealong, said unblocking means includes at least a thin, flexible blade member which is generally translatable along a path intersecting the optical axis and which can flex so as to allow blade member movement along said optical axis at the same time allowing said blade member to translate along said path;

means for supporting said unblocking means for translation along said path and for movement along said optical axis; means for driving said blade member, said driving means including a driving surface which cooperates with said blade member so as to allow translation of said blade member along said intersecting path and along said optical axis; said supporting means including a blade supporting surface for supporting said blade member during translation along said path;

means for magnetically coupling said blade member to said supporting means so as to retain said blade member in initimate supporting engagement with said supporting surface when said blade translates relative to said supporting means along said path, and for intimately retaining said blade in said supporting engagement when said supporting surface moves along said optical axis at the same time allowing said blade member to translate along said path.

3. The mechanism of claim 2 wherein said blade member comprises a layer of magnetically permeable material.

4. The mechanism of claim 3 wherein said magnetic coupling means includes at least a permanent magnet on said supporting surface having a field which magnetically attracts said blade member into said intimate supporting engagement therewith and the field having magnetic shear strength which permits sliding movement of said blade member relative to said supporting surface.

5. The mechanism of claim 4 wherein a plurality of spaced permanent magnets is provided on said supporting surface wherein adjacent ones have opposing magnetic fields facing said blade member whereby flux can travel between adjacent ones of said magnets to enhance holding power of said magnets.

6. The mechanism of claim 4 wherein said unblocking means includes a pair of blades each having a magnetically permeable layer whereby said blades are in intimate sliding contact with each other and said supporting surface because of the magnetic attractive forces by said magnetic coupling means.

7. A photographic apparatus comprising:
means for defining an image plane;
optical means for directing and focusing image forming rays along an optical axis to the image plane, said optical means including at least one lens element displaceable along its optical axis to different focal positions so that at each focal position the image carrying light rays from a subject at correspondingly different distance ranges from the apparatus are focused at the focal plane;
means for unblocking and blocking the optical path to control scene radiation along said axis, said unblocking means includes at least a thin, flexible and magnetically permeable blade member which is generally transversely movable along a path with respect to said optical axis and can also flex so as to follow movement of said optical means along said optical axis at the same time allowing said blade member to move along said path;
said optical means including means movable with said lens element for supporting said blade for movement along said optical axis whereby said blade is a fixed distance from said element;
means for driving said blade member along said path while allowing movement of said blade member along said axis; and,
means for magnetically coupling said blade to said supporting means so as to retain said blade in intimate engagement with said supporting means while said blade moves relative thereto along said path and for intimately retaining said blade in supporting engagement with said supporting means when said supporting means moves with said lens element along said optical axis while at the same time allowing said blade to move along said path, whereby said blade passing across said optical axis is always at said fixed distance to said optical element said coupling means includes a plurality of spaced magnets wherein adjacent ones have opposing magnetic fields facing said blade member, whereby flux can travel between adjacent ones of said magnets to enhance holding power of said magnets.

8. An exposure control mechanism for photographic apparatus for controlling scene light transmission along a given optical axis to a focal plane, said apparatus having a variable lens movable for focusing scene light transmitted along said path, said apparatus comprising:
support means for defining a blade support surface adjoining said light axis;
a blade arrangement comprising at least one blade section of light blocking material mounted in engagement with said support surface for translation across said light axis for controlling the light passed therealong;
means coupling said supporting means to the variable lens of said apparatus for movement of said support surface along said optical axis in response to focusing movement of said lens;
means for driving said blade arrangement along said path while allowing movement of said blade arrangement along said axis; and,
said support means and said blade section being magnetically configured for maintaining said blade section on said support surface by magnetic attraction whereby at least the surface engaging portion of said blade section will follow said movable support surface.

9. The invention of claim 8 wherein at least one end of said blade section is translated in a fixed plane, and said blade section is of sufficiently flexible material to allow flexing of portions of said blade section from said given plane in conformance with and in follower relation to said support surface.

10. The invention of claim 8 wherein said blade section includes magnetically permeable material and said support means includes a permanent magnet providing a magnetic field at said support surface of low enough strength to permit shearing or sliding action of said blade across said support surace and of high enough strength to retain said blade portion on said surface.

11. The invention of claim 8 wherein one of said support means and said blade section are of magnetically permeable material and the other thereof includes permanent magnet material for maintaining said blade section on said support surface by said magnetic attraction.

12. The invention of claim 8 wherein said support means and said blade section includes permanent magnet material having high enough magnetic field strength to maintain said blade section on said support surface and low enough strength to reasonably permit shearing of said magnetic field, thereby allowing sliding movement of said blade section across said suport surface.

* * * * *